Patented Dec. 25, 1923.

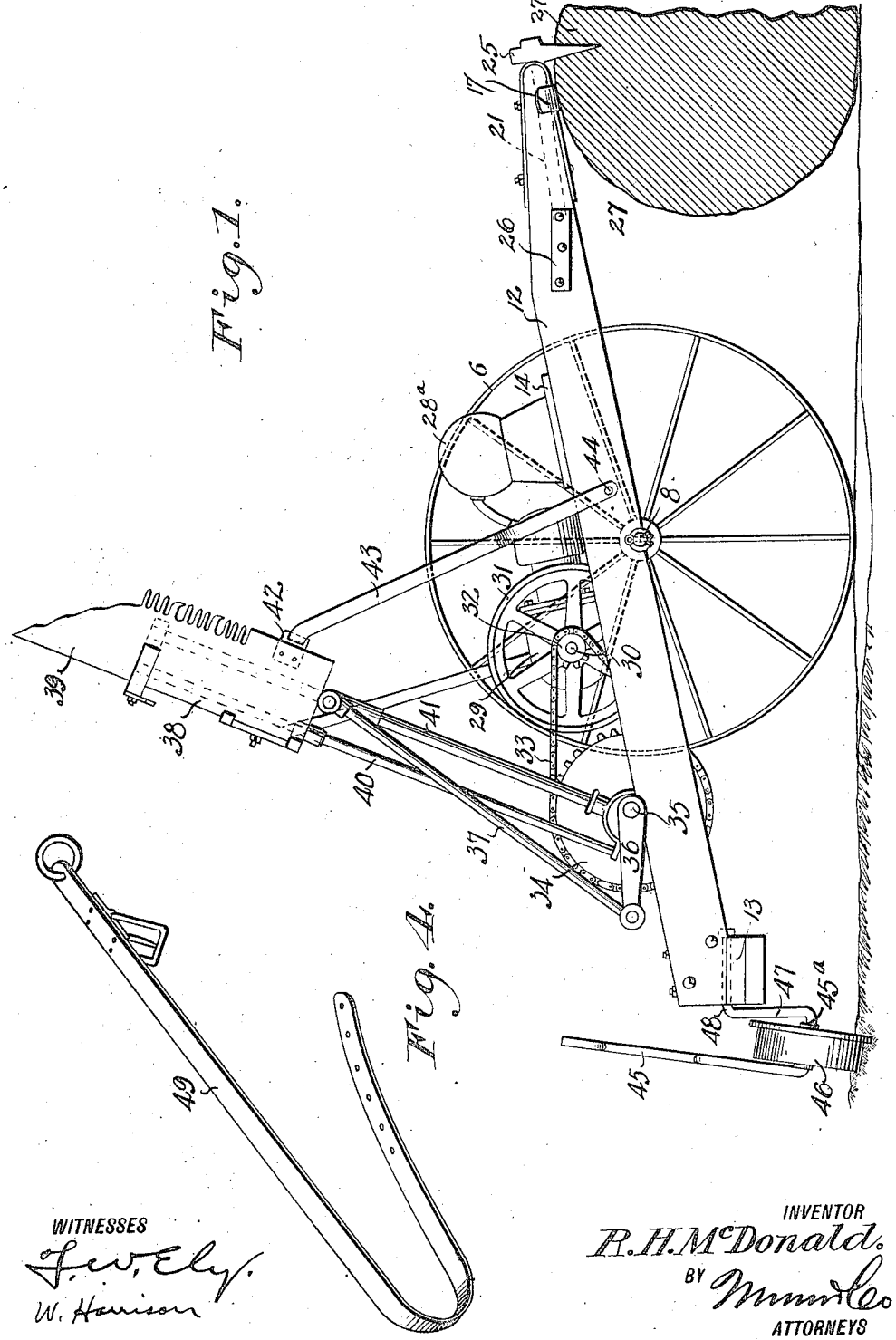

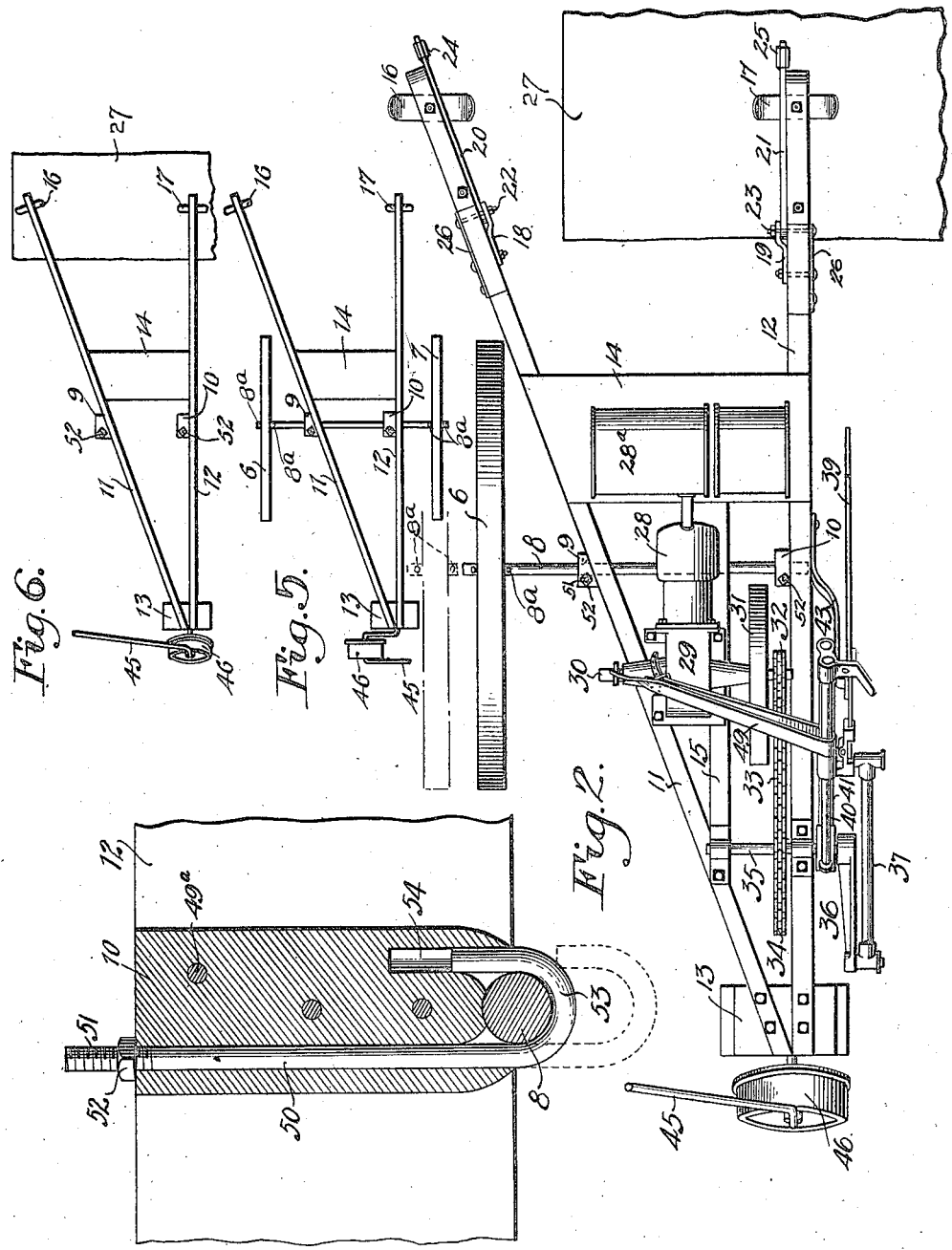

1,478,573

UNITED STATES PATENT OFFICE.

RALPH HOLMES McDONALD, OF SCIO, OREGON.

DRAG SAW.

Application filed December 23, 1920. Serial No. 432,721.

*To all whom it may concern:*

Be it known that I, RALPH HOLMES MC-DONALD, a citizen of the United States, and a resident of Scio, in the county of Linn and State of Oregon, have invented a new and Improved Drag Saw, of which the following is a full, clear, and exact description.

My invention relates to drag saws, my more particular purpose being to provide mechanism, carried by the saw frame, for facilitating the handling of the saw frame and the parts immediately associated therewith.

More particularly stated, I seek to provide mechanism and so mount the same upon the saw frame as to enable the operator to easily shift the frame from one position to another relative to a log or the like to be sawed, without exerting undue muscular energy and without excessive waste of time.

I further seek to prevent the accidental movement of the saw carriage while the device is in action in sawing.

In addition, I seek to prevent excessive vibratory movement of various parts of the device as the carriage is being shifted from one position to another or is being moved along a road.

Finally, I seek to produce various improvements in the mechanism of the saw and various parts for actuating or otherwise controlling the same.

Reference is made to the accompanying drawings forming a part of this application and in which like reference characters indicate like parts throughout the several figures.

Figure 1 is a side elevation of the framework of the mechanism in position for sawing the last cut or two of the log, the saw blade being shown as broken away;

Figure 2 is a plan view of the mechanism as shown in Figure 1;

Figure 3 is a section showing a part of the means for locking the axle of the machine against rotation.

Figure 4 is a perspective of a leather strap used as shown in Figure 2, for steadying certain parts of the apparatus while the carriage is being moved.

Figure 5 is a plan view of the mechanism showing it as in condition to be dragged or trundled along a road.

Figure 6 is a plan view of the framework as the same appears when the parts are ready for sawing.

The truck or carriage wheels of the device are indicated by reference numerals 6 and 7, and they are to be detachably mounted on the removable axle 8, being held in place thereon by linch or other suitable pins 8ª which pass through the axle on each side of the wheels, through openings drilled in the axle for that purpose. This axle extends through bearings 9 and 10 carried respectively by frame beams 11 and 12 having together the V-form as indicated more particularly in Figure 2. The frame beams 11 and 12 are also connected to a plate 13 of massive form. A floor-board 14 extends from one of the frame beams to the other, and a short beam 15 extends from the floor board 14 to the frame beam 11.

The frame beams 11 and 12 are provided respectively with skid shoes 16 17, secured upon the undersides of these beams, and each located near one end of the beam, as shown in Figure 2. These skid shoes are for the purpose of providing the frame beams with slidable bearings at the points where the beams rest upon the log to be sawed. The skid shoes also prevent undue wear of the framework, and in addition act to some extent as anchorages, for the purpose of preventing accidental misplacement of the framework relative to the log. The frame beams 11 are, further, provided with side plates 18, 19, and extending from these side plates are links 20, 21, each having the form of a flat bar. These links are pivotally connected to the side plates 18, 19, and to the frame beams by pivot pins 22, 23, serving practically the purpose of journals for supporting the links 20, 21. These links are, further, provided with dogs 24, 25, for engaging the log to be sawed, the log appearing at 27.

The pivot pins 22 engage side plates 26 through which they extend, as may be understood from Figure 2, the pivot pins thus each being provided with a good support.

The links 20, 21, are swung up and down as occasion may require, in order that the dogs 24, 25, or either of them, may be brought in engagement with the log to be operated upon. When not in active use the links 20, 21, rest idly upon the skid shoes 16, 17, and are thus prevented from swinging downwardly or getting in the way of other parts.

A motor 28 is connected with a fuel tank 28ª which rests upon the floor-board 14 and is thereby supported. The motor 28 is in this instance an internal combustion engine. It is provided with a crank casing 29, and extending through this crank casing is a shaft 30 carrying the flywheel 31 and a sprocket wheel 32. Engaging this sprocket wheel is a sprocket chain 33 which also engages a larger sprocket wheel 34, the latter being mounted rigidly upon a revoluble shaft 35 journaled upon the frame work. Mounted rigidly upon the revoluble shaft 35 is a crank 36, and journaled to this crank is a pitman 37 which is connected with the saw head 38 and thus coupled in operative relation to the saw blade 39. Located adjacent the pitman 37 are guide bars 40 41 upon which the saw head 38 is mounted to slide in the usual or any desired manner.

Secured rigidly upon the saw head 38 is a stirrup 42 which detachably engages the upper end portion of a brace bar 43, this bar being pivotally mounted upon a pin 44 carried by the frame beam 12. The brace bar 43 is used for the purpose of holding the saw head 38, together with the saw blade and parts immediately adjacent thereto, in the respective positions indicated in Figure 1. The parts are arranged as just described when the device is to be transported from one point to another. In order to prevent the saw blade from swinging sidewise, and in fact to prevent various movable parts adjacent the saw blade from being shifted in position accidentally, I provide the strap 49 connected as indicated in Fig. 2. The strap 49 is simply a beltlike strap, made of leather or rawhide, and secured upon any convenient part of the framework, or on any metallic part suitable for the purpose, and brought around the guide bars 40 41. With this strap in position and properly tightened, the device may be rolled along over the ground and the saw blade is unable to give trouble by swinging sidewise. The brace bar 43 prevents the saw blade and parts immediately adjacent the same from falling over backward. A hand lever 45 is provided with a relatively short axle portion 45$^a$ and with a reverting portion 47, as well as with a laterally extending portion 48. This laterally extending portion engages the plate 13 and the adjacent portion of the framework, these parts together forming a bearing for supporting the hand lever. The flanged ground wheel 46 is journaled upon the axle portion 45$^a$ of the hand lever. The operator by grasping the outer or free end of the hand lever can rock this lever as a whole so as to raise the framework of the machine, which thereupon for a moment rests upon the carriage wheels 6, 7, as may be understood from Fig. 1.

The operator by manipulating the hand lever 45 can also raise the adjacent or rear end portion of the frame, and in so doing can exert considerable leverage upon this frame so as to raise the carriage wheels 6, 7 clear of the ground.

In Fig. 3 I show the means whereby the removable axle 8 may be locked rigidly in position. The bearings 9 10 are substantially alike, and only the bearing 10 will be described. This bearing is held in position upon the frame beam 12 by means of pins 49$^a$, as shown in Fig. 3 upon the frame beam 12 by means of pins. A rod 50 extends through a hole in the bearing 10 and is provided with a threaded portion 51 upon which fits a revoluble nut 52. The rod 50 is further provided with a hook-shaped portion 53 which engages the removable axle 8 and may be used for pressing this axle against the adjacent lower end portion of the bearing 10. The hook-shaped portion 53 extends into a hole 54 with which the bearing 10 is provided.

The operator, by turning the nut 52, can raise or lower the rod 50, and in doing this he can tighten the axle 8 or loosen the same, relative to the bearing 10, as may be understood from Fig. 3. There being two of the bearings 9 and 10, the removable axle 8 can be gripped tightly at two distinct points. To permit removal of the axle 8, the hooks 53 are lowered to position indicated in dotted lines Fig. 3.

The operation of my device is as follows: The parts being assembled and arranged as shown and above described, the device is ready for use.

In order to convey the mechanism along the road, the operator can simply grasp the hand lever 45 and by tilting the mechanism to balance it upon the carriage wheels 6, 7 and pulling on the hand lever can trundle the entire mechanism along the road with comparatively little manual effort, as may be understood from Fig. 5.

Having arrived at the log to be sawed the machine is backed up to the log and the lever, or ground wheel end of the frame lowered to the ground thereby raising the skid shoes 16, 17 and dogs 24, 25, up toward the top of the log. Now take hold of large truck wheels and roll them ahead until the dogs are at the right position over log; then drive the dogs into the log so as to hold the same rigidly in position. This done, the axle 8 and truck wheels 6 and 7 are taken off, and the machine set in position all ready for sawing. Upon reaching the last cut or two to be sawed it will ordinarily be found that there is no space on the log or support left for that part of the machine opposite the saw, as the machine is always moved to the left and the dogs that hold it fast are attached to the main part of the log and not to the part to be cut off. To provide for this, I replace axle 8 in position as for transporting, except that the right hand end must come just flush with the right hand side of the frame, or so that it will not project and interfere with the working of the saw, and then clamp said axle 8 tight in the bearings 9 and 10 by tightening down the nuts 52 on the hooked rods 50. The wheel 6 is then placed on the left hand end of the axle, as indicated in Fig. 2, and the machine put in position where it is wished to saw, whereupon the left hand part of the machine will extend beyond the end of the log and is supported by the axle 8 and wheel 6; then drive the dog 25 into the log and saw just as if the entire machine were supported or dogged to the log.

In order to shift the carriage from one part of the log to another part, so that a new cut can be made, the operator uses the hand lever 45. By turning this lever into the position indicated in Fig. 6, he raises the entire weight of the machine, except what is borne by the log. The shifting of the machine as a whole, from cut to cut of the log, is a comparatively easy matter. The end of the machine adjacent the log is shifted by first shifting the end in immediate engagement with the log to a new position upon the log, and then following this movement by shifting the rear end of the machine by aid of the ground wheel 46, as above described.

It sometimes happens that in sawing a log into short pieces, there is difficulty in sawing the last one or two cuts, owing to the lack of a suitable rest for the framework of the machine; that is to say, the log becomes too short to afford a good mounting for the framework of the machine during the time while the last cut or two is being made. In this event, as hereinbefore stated, I support the left side of the framework upon the axle 8 and carriage wheel 6, and by clamping the axle and wheel in place the support for the saw is rendered sufficiently rigid and firm for all practical purposes. In other words, it is not necessary for the framework to rest upon both of the carriage wheels 6, 7, while the last cut or two is being made.

I do not limit myself to the precise mechanism shown, as variations may be made therefrom within the spirit of my invention, the scope of which is commensurate with my claims:

Having thus described my invention, what I claim as new and desire to secure by Letters Patent is as follows:

1. In a drag saw, the combination of a V frame comprising a pair of frame beams, a skid shoe mounted upon each of said frame beams and extending laterally therefrom, a pair of links journaled upon said frame beams and disposed adjacent said skid shoes so that said links may be rested upon said skid shoes, and dogs carried by said links for the purpose of engaging a log to be sawed.

2. In a drag saw the combination of a carriage provided with frame beams for engaging at their front ends a log to be sawed, a hand lever journaled at the rear end of said carriage and provided with an outwardly extending portion serving as an axle, said axle portion extending longitudinally with respect to the carriage, and a flanged ground wheel mounted on said axle portion, the relative arrangement of the hand lever and flanged ground wheel being such that upon turning of the hand lever in one direction the ground wheel will bite into the ground and raise the adjacent end of the carriage, whereby the weight rests upon the ground wheel and longitudinal shifting of the carriage prevented.

3. In a drag saw, the combination of a carriage provided with portions for resting upon a log to be sawed and movable longitudinally thereof, means for supporting the carriage at its rear end on the ground and holding it against said movement, and a flanged wheeled mechanism operable at the will of the operator and connected with said carriage at its rear end for lifting the weight of said carriage off of said means in order to facilitate shifting the position of said carriage along to the log to be sawed.

4. In a drag saw the combination of a frame, mechanism carried by said frame for engaging a log to be sawed, carriage wheels connected with said frame for normally supporting the weight thereof, a transverse ground wheel at the rear end of the frame, mechanism connected with said ground wheel and with said carriage frame and operable at the will of the operator for forcing said ground wheel against the ground in order to raise the adjacent or rear end of said carriage frame, and a sawing mechanism mounted upon the said carriage frame for sawing a log.

RALPH HOLMES McDONALD.